United States Patent Office 2,787,277
Patented Apr. 2, 1957

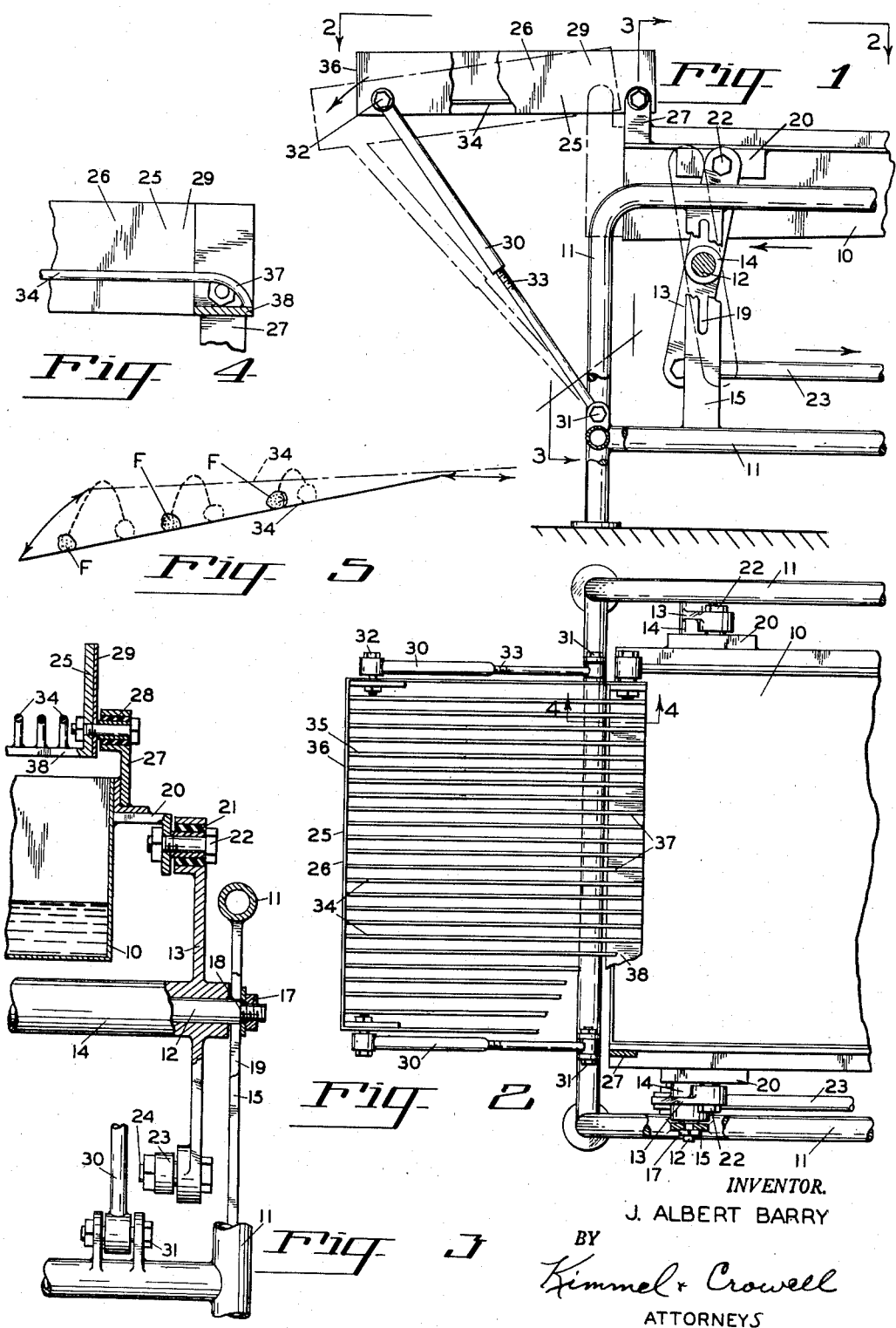

2,787,277

MOUNTINGS FOR OSCILLATING SCREENS

John Albert Barry, Salem, Oreg.; Alfrieda F. Barry, administratrix of said John Albert Barry, deceased, assignor to Vern Reiman, Salem, Oreg.

Application August 5, 1955, Serial No. 526,639

6 Claims. (Cl. 134—61)

This invention relates to shaker screens for fruit washers, and is particularly adapted for strawberries and other types of berries.

The primary object of the invention is to provide a mounting or support for the screen that will cause the materials to travel along the screen while the screen is in approximately a level position, or even when inclined upwardly to some extent.

With the prior art screen mountings, the screen has to be on a slope downwardly to cause the materials to move forwardly.

It has been found that a dry screen in advance of the washing tray will remove leaves, dirt, twigs, blossom ends and other particles from the fruit before they are submerged in the washing tray.

In the use of this screen, it has also been found that causing the fruit to travel upwardly on an incline, removes the dirt and leaves from the fruit while the fruit is traveling up this incline, therefore another object of this invention is to provide a dry screen that will cause the fruit to move on an upward incline to a point above the washing tray on approximately a level plane before being delivered into the washing tray. This gives the dirt and leaves a chance to sift down between the fruit and the screen bars before entering the said washing tray.

These and other incidental objects will be apparent in the drawings, specification and claims.

Referring to the drawings:

Figure 1 is a fragmentary view of a washing machine having the new and improved dry screen shaker mounted thereon;

Figure 2 is a plan view of the invention illustrated in Figure 1;

Figure 3 is an enlarged fragmentary transverse sectional view, taken on line 3—3 of Figure 1, looking in the direction of the arrows;

Figure 4 is an enlarged fragmentary detail sectional view, taken on line 4—4 of Figure 2, looking in the direction of the arrows, and Figure 5 is a diagram illustrating how the fruit is made to walk up the inclined surfaces of the dry screen.

Referring now more specifically to the drawings, wherein like reference numerals indicate like parts throughout the several figures, the reference numeral 10 indicates a fragmentary portion of a fruit washing tray. The tray 10 is supported by a framework 11 by way of the cross shaft 12 through the rocker arms 13. The cross shaft 12 carries a tube 14. The tube 14 is rotatably supported to the frame member 15 by way of the shaft 12, which is clamped to the frame member 15 by the nut 17 tightened against the member 15 forcing the same against a shoulder 18 on shaft 12 within the slot 19. This permits up and down adjustment of the elevation of the washing pan 10, as best illustrated in Figures 1 and 3.

Brackets 20 are fixedly secured to the pan 10 and are adapted to be pivotally connected to the rocker arms 13 by way of the rubber mounting 21 and the bolt 22. The rocker arms 13 are operated by any suitable means through the connecting rod 23. This connecting rod is connected to the rocker arms by a rubber mounted pivot bearing 24.

My new and improved dry screen unit is indicated by numeral 25 and consists of a U-shaped sheet body 26. One end of this body is pivotally mounted to the washing tray 10 by way of the brackets 27 through the rubber mounting 28, which is connected to the sides 29 of the screen unit 25, as best illustrated in Figures 1 and 3.

The opposite end of the unit 25 is supported by the telescopical legs 30. The lower ends of these legs 30 are pivotally connected to the frame 11 by pivot 31, while their upper ends are connected to the unit 25 by pivots 32 of the rubber mounting type. The legs 30 are adjustable in length by way of the threads 33.

Rods 34, having one of their ends 35 connected to the end 36 of the body unit 25 and their opposite ends 37 mounted to the cross member 38, as best illustrated in Figure 4, provide a screen 25 over which the fruit F is moved for the separation of dirt and leaves from the said fruit F. The ends 37 of the rods 34 are curved down as indicated in the drawings at their discharge ends.

The operation of this machine will now be described. In the washing of berries and the like, it is desirable that the dirt and leaves be removed before the berries enter the washing fluid, therefore the screen unit 25 is mounted to the feed end of the washer 10, as above described. As the oscillating connecting rod 23 is operated by a power means (not shown), it will oscillate the rocker arms 13 as indicated by the arrows. This oscillation consists of a very short stroke, but in order to more easily show the operation of the machine, I show a much longer stroke being imparted to the mechanism than would ordinarily be used.

In the operation of the device, as the wash tank 10 is oscillated it will oscillate the screen unit 25. At the same time, as this horizontal oscillation takes place the supporting legs 36 will lower and raise the outer end of the screen 25, as best illustrated in Figures 1 and 5. This screen 25 is mounted so that it will never slope downward into the washing tank 10, but will always be on a slight incline towards its discharge end. The arcuate movement of the supporting legs 30 tend to throw the fruit upward and forward of this screen 25, as best illustrated in Figure 5, towards its discharge end leading to the washer 10, at the same time separating the dirt from the berries or other fruit being processed. This can only be accomplished thoroughly by this upward movement of the berries over the screen rods 34.

Thus it can be seen that with this invention, the complete separation of dirt, leaves and other foreign matter from the berries or fruit before the berries enter the washer tank 10 is effectively accomplished.

Another outstanding feature is the fact that the screen 25 and wash tray 10 are mounted completely through rubber mountings or bearings, eliminating wear and need for lubrication.

Having thus described the preferred form of the invention, it should be understood that numerous structural modifications and adaptations may be resorted to without departing from the scope of the appended claims.

What is claimed is:

1. A fruit cleaning device comprising a frame, a container for fluid, means mounting said container to said frame for oscillating motion therein, a screen pivotally secured at one end to one end of said container, means pivotally and adjustably supporting the opposite end of said screen to said frame with said second end of said screen lower than said first end of said screen, and means for oscillating said container and said screen.

2. A device as claimed in claim 1, wherein said screen includes a multiplicity of parallel bars extending longitudinally of said screen.

3. A device as claimed in claim 1, wherein said container and said screen are vertically adjustable.

4. A device as claimed in claim 2, wherein said container and said screen are vertically adjustable.

5. A device as claimed in claim 1, wherein the means mounting said container includes links secured to said container by resiliently mounted pivots.

6. A device as claimed in claim 1, wherein resiliently mounted pivot secures said screen to said container.

References Cited in the file of this patent
UNITED STATES PATENTS

| | | |
|---|---|---|
| 2,538,285 | Swayze | Jan. 16, 1951 |
| 2,591,086 | McLauchlan | Apr. 1, 1952 |